UNITED STATES PATENT OFFICE.

MORTON GREGORY, OF TACOMA, WASHINGTON, ASSIGNOR TO WESTERN RUBBER COMPANY, A CORPORATION OF WASHINGTON.

RUBBER SUBSTITUTE AND PROCESS OF PRODUCING THE SAME.

1,321,788. Specification of Letters Patent. Patented Nov. 11, 1919.

No Drawing. Application filed March 13, 1916. Serial No. 83,815.

*To all whom it may concern:*

Be it known that I, MORTON GREGORY, a citizen of the United States, and a resident of Tacoma, in the county of Pierce and State of Washington, have invented certain new and useful Rubber Substitutes and Processes of Producing the Same, of which the following is a specification.

This invention relates to a new composition of materials forming a substance having the general properties of rubber, and to the method of producing and treating the same, and has for its principal object; the production of a new substance having relatively high commercial value and which it is possible to produce from a hitherto almost waste material, such substance having many of the desirable qualities of rubber for which it may be employed as a substitute in many cases, or with which it may be compounded.

The composition of materials forming the new substance of my invention consists of a base of fish oil, fish, or fish-scrap relatively rich in fixed oil and a reducing agent, preferably sulfur, through which, under suitable treatment, said oil and any organic matter included therein are converted into a commercial substance. By the expression fish-scrap is meant the heads, tails, scales, fins, entrails and bones of the fish in contradistinction to fish cut indiscriminately into small pieces.

One hundred pounds of the least valuable fish for my purpose contains approximately eighty-five pounds of water, ten pounds of solids of various kinds, and five pounds of oil.

The quantity of sulfur may vary from twenty-five to ten per cent. of the amount of oil when oil only is used or oil and solids from the fish or fish-refuse present when fish alone is used, depending upon the variety of fish or fish oil used. In other words, when oil alone is used as the base, the amount of sulfur is from twenty-five per cent. to ten per cent. of the oil, and when fish alone is used the amount of sulfur is from twenty-five per cent. to ten per cent. of the combined oil and solids of the fish. An additional amount of sulfur is required over the amount needed to reduce the oil present to act upon and break down the fish structure. To the above stated amounts of fish, I add in all from three and three-fourths pounds to one and one-half pounds of sulfur. The sulfur is added to the base either as a whole or preferably gradually as the reaction takes place.

The mixture consisting of the base and the sulfur gradually heated in an open vessel to a temperature of approximately 175. degrees centigrade by which time the moisture in the material has been expelled and reaction accompanied by ebullition is taking place.

The heat is gradually increased to a temperature of 220° centigrade and at the expiration of from one to two hours from the period when the reaction begins, the material will have assumed a homogeneous plastic state in which no characteristics of the original base are evident.

At this stage of the process for making a new substance, various materials may be added and compounded therewith to adapt it to different purposes or to render it more easily worked; such as the addition of metallic oxids, for instance, lead oxid, for the purpose of accelerating and intensifying the reaction in the following step in the process. In practice I have found that a portion of the sulfur employed in my process may be desirably added to the material at this stage. Said plastic mass with or without the additions noted is then subjected to a temperature of approximately 155° centigrade in a closed vessel under pressure from thirty to sixty minutes until the reaction in complete. The substance is then removed from the closed vessel and allowed to cool. The original constituents of the base have lost their identity and there is resulting a substance that has many of the characteristics of rubber and may be rolled out in sheets, molded into various forms, compounded and vulcanized; it may also be used advantageously in compounding with rubber, displacing a large proportion of the rubber usually used.

It will be readily understood that I may include as a base, any suitable form of organic matter through which a similar result may be accomplished.

Through my invention I may utilize the entire aggregated mass of fish or fish-scrap and convert the same into a new substance.

What I claim is—

1. The process which consists in combining fish oil and sulfur in the presence of heat and resubjecting the resultant combination to heat under pressure.

2. The process which consists in combining fish oil and sulfur in the presence of gradually increasing heat and resubjecting the resultant combination to heat under pressure.

3. The process which consists in combining oil and sulfur in the presence of heat and resubjecting the resultant combination to heat at a lower temperature under pressure.

4. The process which consists in combining fish and sulfur in the presence of heat and resubjecting the resultant combination to heat under pressure.

5. The process which consists in combining fish and sulfur in the presence of gradually increasing heat and resubjecting the resultant combination to heat under pressure.

6. The process which consists in combining fish and sulfur in the presence of heat and resubjecting the resultant combination to heat at a lower temperature under pressure.

7. The process which consists in combining fish and sulfur in the presence of gradually increasing heat and resubjecting the resultant combination to heat at a lower temperature under pressure.

8. The process which consists in treating with heat fish having approximately five per cent. of fixed oil together with sulfur in an open vessel, withdrawing said material in a homogeneous plastic state and subjecting the same to a reduced temperature under pressure.

9. The process which consists in treating fish and sulfur with heat in an open vessel until the mixture assumes a homogeneous, plastic condition, and then subjecting it to a reduced temperature under pressure.

10. The process which consists in treating fish oil and sulfur with heat in an open vessel until the mixture assumes a homogeneous, plastic condition and then subjecting it to a reduced temperature under pressure.

11. The process consisting in mixing raw fish containing five per cent. or more of fixed oil together with sulfur in the appropriate proportions by weight of five to one respectively, treating the mixture with heat at a temperature of from 175 degrees centigrade to 220 degrees centigrade for a period of one to two hours, further treating the resultant mass with heat at a temperature of about 155 degrees centigrade under a relatively high pressure for a period of from thirty to sixty minutes.

12. The process consisting in first combining fish and sulfur by gradually adding the sulfur to the fish and at the same time heating the mixture at increasing temperatures from 175 degrees centigrade to 220 degrees centigrade in an open vessel, second adding a further amount of sulfur and metallic oxid, and third, treating this mass under relatively high pressure in a closed vessel for a period of from thirty to sixty minutes, at a temperature of approximately 155 degrees centigrade.

13. The process which consists in first combining fish oil and sulfur by gradually adding the sulfur to the fish oil, and at the same time heating the mixture in an open vessel at increasing temperatures from 175 degrees centigrade to 220 degrees centigrade, and then adding a further amount of sulfur and a metallic oxid, and finally heating this mass under relatively high pressure in a closed vessel for thirty to sixty minutes and at a temperature of approximately 155 degrees centigrade.

14. The process which consists in first combining fish oil and sulfur by gradually adding the sulfur to the oil and at the same time heating the mixture in an open vessel at increasing temperatures of from 175 degrees centigrade to 220 degrees centigrade and then adding a further amount of sulfur and a metallic oxid, and finally heating this mass under pressure.

15. The herein described process which consists in combining fish oil and sulfur in the presence of heat and subjecting the resultant combination to pressure and heat at a lower temperature until reaction and reduction is complete.

16. The herein described process consisting in mixing fish oil and sulfur in the approximate proportion by weight of five to one respectively, treating said mixture with heat at a temperature of from 175 degrees centigrade to 220 degrees centigrade for a period of from one to two hours and subjecting the resultant matter to heat at a temperature of 155 degrees centigrade under relatively high pressure for a period of from thirty to sixty minutes.

17. The herein described process which consists in combining raw fish and sulfur in the presence of heat, resubjecting the resultant combination to pressure and heat until relatively complete reaction and reduction results.

18. The herein described process which consists in combining raw fish and sulfur in the presence of heat, resubjecting the resultant combination to pressure and heat at a lower temperature until relatively complete reaction and reduction results.

19. The herein described process of producing a rubber substitute, consisting in heat-treating a mixture of fish oil and sulfur under pressure.

20. A rubber substitute comprising a heat and pressure treated mixture of fish oil and sulfur.

MORTON GREGORY.